United States Patent [19]

Guillermier

[11] 4,427,047
[45] Jan. 24, 1984

[54] MACHINE FOR FITTING SPOKES INTO WHEEL HUBS

[75] Inventor: Bernard Guillermier, Epagny, France

[73] Assignee: Bg Technic (Sarl), Pringy, France

[21] Appl. No.: 320,495

[22] Filed: Nov. 12, 1981

[30] Foreign Application Priority Data

Nov. 19, 1980 [FR] France .............................. 80 24529

[51] Int. Cl.³ .............................................. B21K 1/34
[52] U.S. Cl. .................................................... 157;1.5
[58] Field of Search ....................... 157/1.5, 1.55, 3, 4; 29/159.02, 802

[56] References Cited

U.S. PATENT DOCUMENTS 4,062,095 12/1977 Storz ........................... 157/1.5 X

FOREIGN PATENT DOCUMENTS

430703 2/1948 Italy ................................. 157/1.5

Primary Examiner—James G. Smith
Attorney, Agent, or Firm—Roland Plottel

[57] ABSTRACT

A machine is provided for fitting spokes into wheel hubs comprising rotatable support arms for taking a hub and bringing it into an inclined position, means for rotating the hub, selection and guide means for fitting spokes one by one into the holes of said hub. The arms turn the hub over after insertion of one spoke out of two, so as to effect insertion of the other spokes.

6 Claims, 13 Drawing Figures

MACHINE FOR FITTING SPOKES INTO WHEEL HUBS

BACKGROUND OF THE INVENTION

The present invention relates to a machine for fitting spokes into wheel hubs.

Such machines are known in which the hubs are disposed with their axis horizontal and in which the horizontal spokes are pushed into the holes in the hubs. Such machines are very complicated and in addition, should a positioning error occur, the spoke twists and the machine has to be stopped.

SUMMARY OF THE INVENTION

The machine in accordance with the invention for fitting spokes to wheel hubs comprising two rings each pierced with 2n holes evenly spaced apart is characterized in that it comprises on the one hand at least one post comprising:

first means for holding the hub in a position such that its axis forms and acute angle less than 30° with the vertical, second means for rotating the hub about its axis, a first and a second tube adjustable in position and forming a small angle with the axis of the hub, each terminating in a nose-piece, each nose-piece being associated with a ring of the hub, third means for vertically reciprocating said nose-pieces, these latter being placed in a low position just above the associated rings for supplying the holes, fourth means for spoke-by-spoke feeding of each tube when the nose-pieces are in their low positions, the spokes descending by gravity into the tubes with their flattened part upwards, fifth means for controlling said first, second, third and fourth means so that the hub is rotated in a selected direction to perform a revolution during which the nose-pieces are brought down n times and so that, after each downward motion of the nose-pieces, a spoke is fed into each tube, the nose-pieces being lowered every $(2\pi/n)$ and only being raised again after having each passed over at least one hole and after a spoke has fallen by gravity into the first hole met by each of the nose-pieces, on the other hand means for handling the hub so as to take the hub after the first pass and replace it, after turning it over, in a position where the remaining holes will be provided with spokes during a second pass.

In the machine of the invention, the hubs form an angle less than 30° with the vertical which allows the force of gravity to be used for causing the spokes to enter into the corresponding holes without risk of twisting these spokes.

In a first embodiment of the invention, the handling means replace the hub, after turning it over, in the position that it had during the first pass and the tubes are adjusted so that the two nose-pieces each overhang a hole simultaneously.

Thus all the spokes are placed in position in the same station. The machine may only comprise one post and is then particularly simple.

According to a second embodiment of the machine of the invention, it comprises two similar posts, the tubes of each post each overhang a hole simultaneously, the upper nose-pieces of the two posts being offset by 2 $k(\pi/n)$ (k a whole number $\geq 0$) and the handling means take the hub from the first post in which every other hole has been provided with a spoke during the first pass, and places it, after turning it over, between the first means of the second post where, during the next pass, the holes remaining empty are provided with spokes.

In this second embodiment, the handling means advantageously comprise four grips which move between four positions for simultaneously bringing empty hubs into a work position in the first post, bringing hubs half of whose holes are provided with spokes from the work position of the first post to the work position of the second post and removing the full hubs from the work position of the second post.

According to another characteristic of the invention, each post is provided with detection means supplying an error signal indicating that the spoke has not completely entered into the corresponding hole and the control means in response to the signal from the detection means control the two means of the post, in a first stage, to rotate the hub by an angle less than or equal to $(\pi/n)$ in the reverse direction of the selected direction then, in a second stage, rotating by the same angle in the selected direction.

It is also possible to increase the reliability of the machine. In fact, even if the spoke has not entered into the corresponding hole, the hole is caused to pass again several times in front of the nose-piece of the tube thus allowing the spoke to come into position.

According to another particularly simple embodiment of this feature, the detection means comprise a carriage laterally movable from a stop to which it is returned, the two tubes being mounted on said carriage; the carriage is driven as far as another stop by the rotational movement of the ring communicated to the tube by the spoke partly situated in said tube and incompletely fitted into the hole of the ring; the two tubes are disposed so that the carriage tends to approach the second stop when a spoke is jammed in one or the other tube, one of the two stops is provided with a detector supplying the error signal.

BRIEF DESCRIPTION OF THE DRAWINGS

The invention will now be described in greater detail with reference to two particular embodiments given by way of example and shown in the accompanying drawings.

DESCRIPTION OF THE PREFERRED EMBODIMENTS

Figure 1:
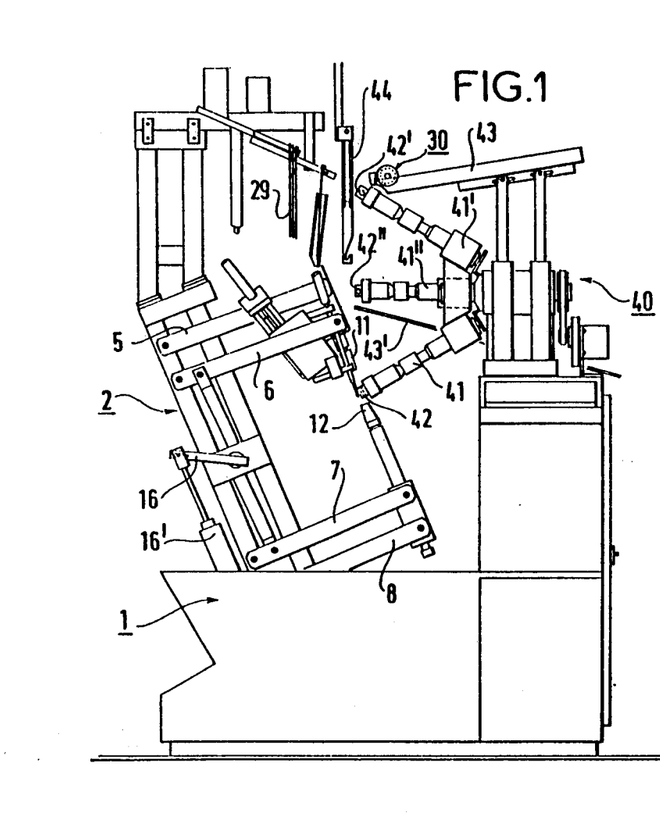
FIG. 1 shows a side view of the machine of the invention.

The machine such as shown in FIG. 1 comprises a frame 1 on which is mounted a post 2. Post 2 (see FIG. 3) comprises two fixed parallel beams 3 and 4 situated in a vertical plane and inclined by 22°30′ with respect to the vertical.

Figures 3, 4:
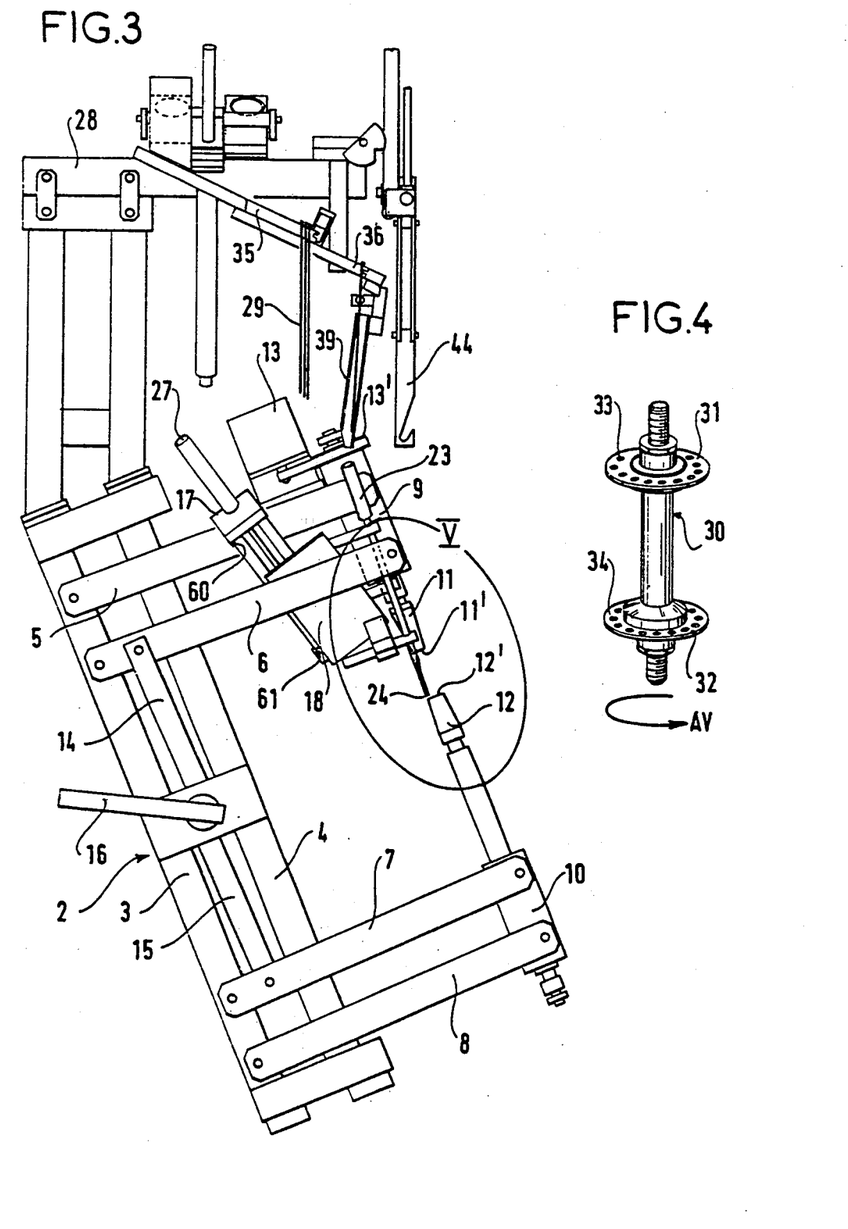
FIG. 3 shows a detailed side view of the lower part of the loading post of the machine.
FIG. 4 shows a hub.

On beam 3 there are pivotably mounted four lateral beams 5, 6, 7 and 8 which may assume a position perpendicular to beam 3. At the end of beams 5 and 6 is mounted a beam 9 parallel to beam 3 forming with beams 5 and 6 and the fixed beam 3 a deformable parallelogram. Similarly, at the end of beams 7 and 8 there is mounted a beam 10 forming with beams 5 and 6 and fixed beam 3 a deformable parallelogram. Beams 9 and 10 are aligned and have passing therethrough rotatable shafts 11 and 12. Shaft 11 is rotated through a notched pulley 13′ by means of a motor 13 fixed to beam 9.

Beam 6 is raised under the effect of a bar 14 and beam 7 is lowered under the effect of a bar 15. Bars 14 and 15 are operated simultaneously by an arm 16 which is the link of two coupling rods, one comprising bar 14, the other bar 15. Arm 16 is operated by means of a jack 16′.

On beam 5 is mounted a shaft 5′ parallel to beam 5 and about which a carriage 17 may pivot. On carriage 17 is mounted a block 18 having two pairs of swiveling rods 19, 20 and 21, 22 (see FIG. 6). At the end of pair 19, 20 is disposed tube 23 terminating in a nose-piece 24. At the end of pair 21, 22 is disposed a tube 25 terminating in a nose-piece 26. These tubes may be swiveled by means of rods 19, 20 and 21, 22 and may be positioned by means of screws which serve for locking them in the rods.

Figure 6:
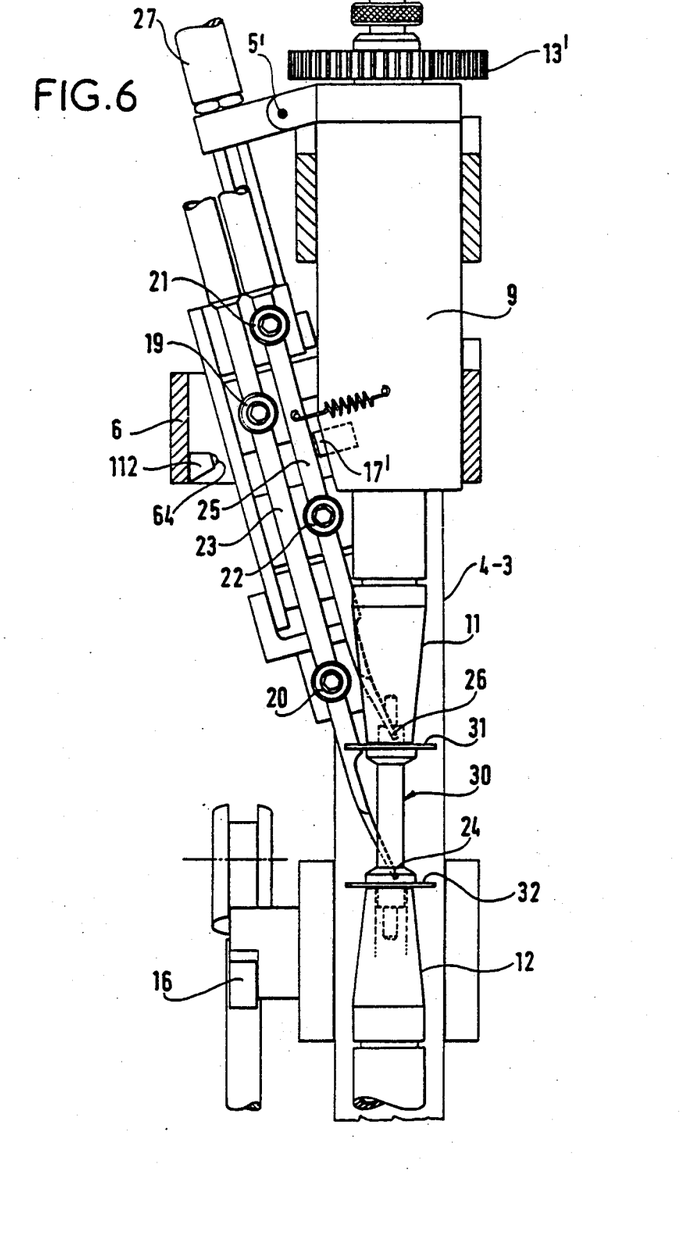
FIG. 6 shows a detailed view of the carriage of the loading post.

Carriage 17 is drawn by a spring against a stop 17′ (integral with beam 9) into a work position in which the nose-pieces of the tubes are positioned so that the spokes penetrate into the hubs.

Carriage 17 may, by rotating about its axis, move away from this position so as to come into abutment against an adjustable stop 112 provided with a detector 64 (integral with beam 6).

On carriage 17 is mounted a jack 27 which allows block 18 to be raised by a certain height h which is greater than the distance separating the ends 11′, 12′ of shafts 11 and 12.

A stop 60 is activated when block 18 is in a high position and a stop 61 is activated when block 18 is in a low position.

Figure 5:
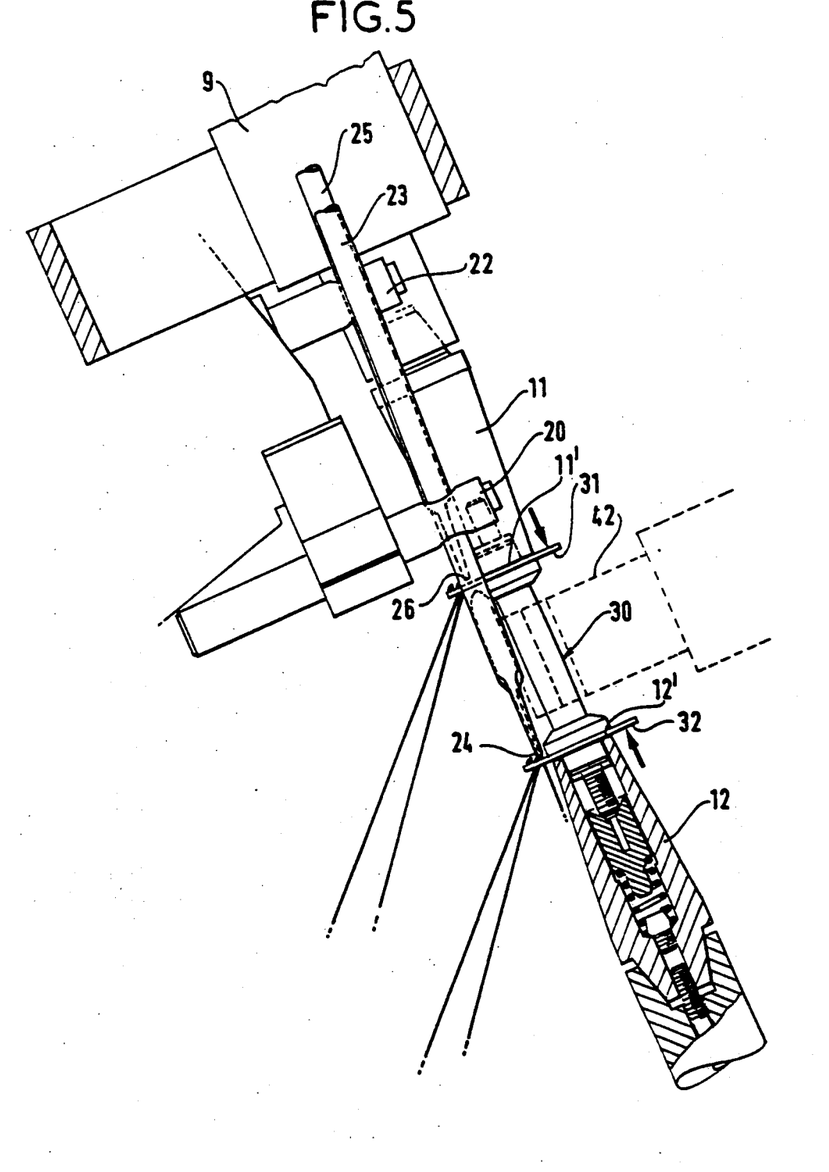
FIG. 5 shows a hub introduced between the two shafts.

Between the end 11′ of shaft 11 and the end 12′ of shaft 12, a wheel hub 30 may be jammed, the hub axis merging with the axis of symmetry of shafts 11 and 12 (see FIG. 5).

This hub comprises two rings 31, 32 each having 2n holes 33, 34. The holes 33 are spaced evenly apart on a circumference of ring 31 and holes 34 are spaced evenly apart on a circumference of ring 32 (see FIG. 4).

Tubes 23 and 25 have been positioned so that when nose-piece 24 is above a hole on the upper ring 31, nose-piece 26 is above a hole of the lower ring 32. Furthermore, nose-pieces 24 and 26 are positioned so that when hub 30 rotates in the trigonometric direction (forward direction), it drives carriage 17, through a spoke jammed in a ring and in one of the tubes, towards its adjustable stop 112 having a detector 64.

When link 16 is actuated, the ends 11′ and 12′ move away from each other releasing hub 30.

Post 2 (see FIGS. 7 and 8) also comprises a gantry 28 whose vertical beams 29 are fixed to the tops of the fixed beams 3 and 4. To this gantry 28 are fixed two juxtaposed ramps 35 and 35′ in which spokes 29 are engaged with their flattened part 29′ upwards (in FIG. 7, only ramp 35′ is visible, ramps 35 and 36 and the associated guide 39 and tube 23 have been omitted).

Figure 7:
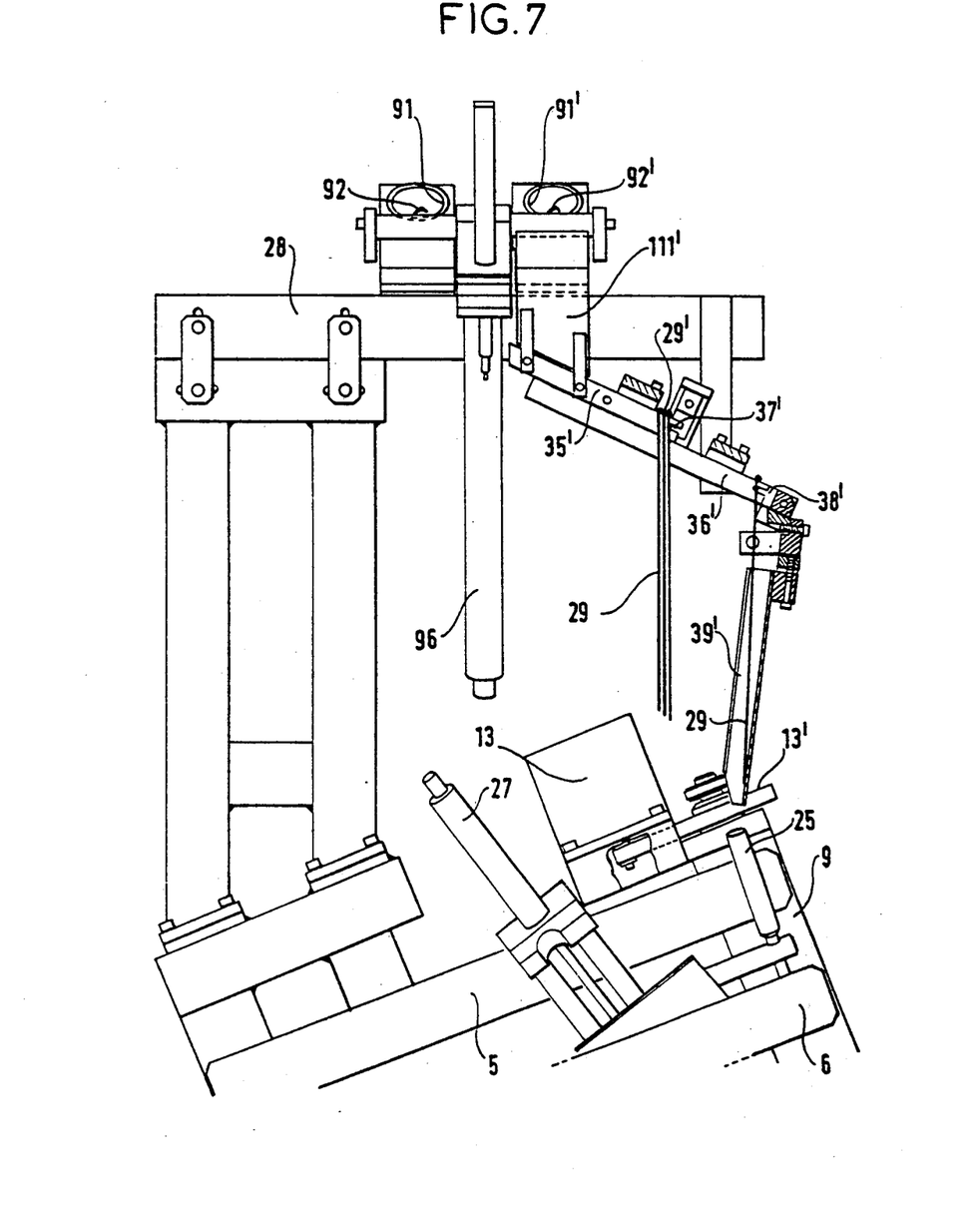
FIG. 7 shows a side view of the upper part of the loading post.

Ramps 35, 35′ form an angle of 25° with respect to the horizontal and the spokes move therein while always remaining vertical.

Below ramps 35 and 35′ are disposed two juxtaposed ramps 36 and 36′ and parallel to ramps 35 and 35′ (only ramp 36′ can be seen in FIG. 7).

Only ramps 35′ and 36′ will be described.

At the lower end of ramp 35′ is disposed a latch 37′ which blocks a series of spokes 29 which follow one another and which, when it is actuated, lets only a single spoke escape.

The spoke falls by the force of gravity into ramp 36′, whose lower end is offset downwardly with respect to the lower end of ramp 35′. At the lower end of this ramp 36′ is disposed a latch 38′.

The spoke comes into abutment against latch 38′ and is engaged in an open guide 39′ which is inclined by 5° with respect to the vertical but in the opposite direction relative to the angle of 22°30′ through which beams 3 and 4 are inclined. Guide 39′ has a length equal to that of a spoke and it is in the form of a half-cylinder open towards the near. The lower aperture of this guide 39′ overhangs the upper aperture of tube 25. Thus, when latch 38′ is actuated, the spoke held up by this latch is released and falls by gravity along guide 39′ into tube 25.

Ramps 35 and 36 are also provided with latches 37 and 38 and a guide 39 whose aperture overhangs tube 23. A detector 62 detects the presence of a spoke in guide 39 whereas a detector 63 detects the presence of a spoke in guide 39′.

Figures 8, 9A, 9B:
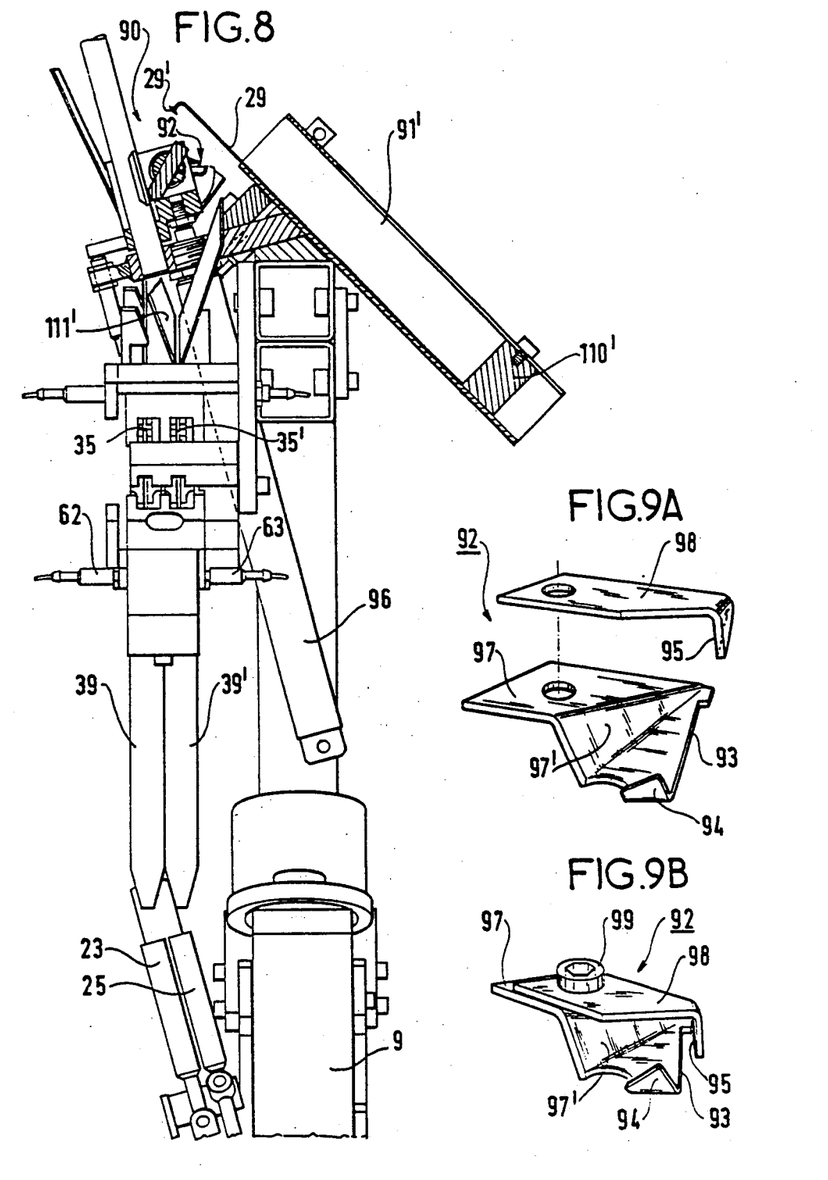
FIG. 8 shows a front view of the upper part of the loading post.
FIGS. 9A and 9B show a view of the comb for placing the spokes on the ramps.

Ramps 35 and 35′ may be supplied with spokes manually or else automatically. In FIGS. 7 and 8 are shown devices for automatically loading ramp 35′.

The device 90 associated with ramps 35 and 35′ comprises two trays 91, 91′ for spokes having an adjustable bottom 110, 110′. In FIG. 8 only tray 91′ for supplying ramp 35′ has been shown. Each tray 91, 91′ is tilted at 45° and the heads or flattened parts of the spokes project from the aperture of the trays.

Device 90 comprises, associated with each tray, a comb 92, 92′.

Combs 92, 92′ (see FIGS. 9A, 9B) are movable in translation over a ramp slightly inclined with respect to the vertical under the action of a jack 96 and rotate about a horizontal axis under the action of cams (not shown).

Each comb 92, 92′ comprises a lower part 97 and an upper part 98 joined together by a nut 99. The lower part 97 comprises a dihedron 97′ having an inclined ramp 93 terminating in a tooth 94. Ramp 93 is overlaid by a ramp 95 of part 98 in the position opposite tooth 94.

Thus, when comb 92′ is raised, the portion of ramp 93 adjacent tooth 94 comes into contact with one or more spoke heads. Comb 92′ continues to rise while rotating upwardly. When tooth 94 is higher than ramp 93, the heads of the spokes slide by the effect of gravity between ramps 93 and 95. When comb 92′ reaches its high position, the spokes whose heads are gripped by comb 92′ are completely removed from the tray and have then through the effect of gravity a vertical position. When reaching its high position, the comb pivots downwardly and the heads of the spokes slide towards tooth 94, the lower end of the spokes then being engaged through a V-shaped piece 111' in ramp 35'. In the vicinity of tooth 94, the heads of the spokes escape from ramp 93 and the spokes fall under the effect of gravity into ramp 35' where they remain suspended by their heads.

The axis of hub 30 (see FIGS. 4 and 5) in the work position, i.e. jammed between shafts 11 and 12, must form an angle a less than 30° with the vertical and the axis of the tubes will form an angle b between 2° and 15° with respect to the plane passing through shafts 11, 12 and the fixed beams 3 and 4 and an angle c between 2° and 15° with respect to the plane perpendicular to the preceding one and passing through shafts 11 and 12. The angle between the traveling direction of a hole of the ring and the spoke-feeding tube being at most equal to 90°.

Preferably angle a will be equal to 22°30', angle b equal to 4° and angle c 7°.

Figure 2:
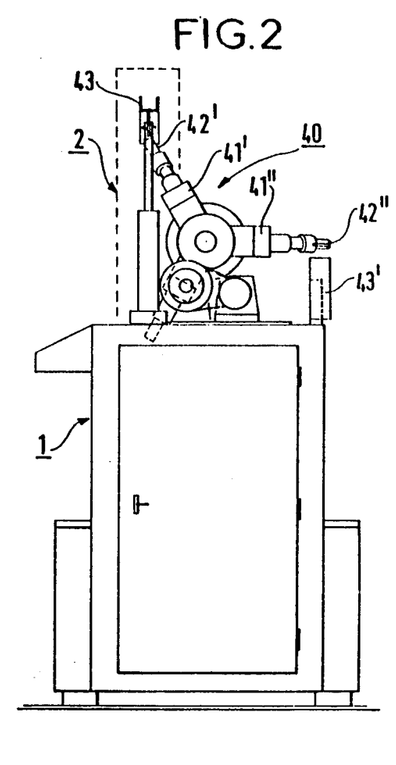
FIG. 2 shows a front view of the machine of the invention.

The machine shown in FIG. 1 further comprises handling means 40 comprising three arms 41, 41', 41" orientated along three axes evenly spaced apart about a horizontal axis (see FIG. 2 also). Each arm has at its end a gripping means 42, 42', 42" which grips the middle of the hub, the two rings are then situated respectively on each side of the gripping means. Each gripping means may rotate through 180° about the axis of the arm. The arm assembly rotates through 120° about a horizontal axis and serves for transporting the empty hubs to the work position between ends 11' and 12', holding the hub in position while one hole out of two is filled with a spoke, turning the hub over, removing the hubs completely provided with spokes. There has been simply shown a ramp 43 for feeding empty hubs and hooks 44 for transporting the empty hub from ramp 43 to the gripping means 42 of arm 41. Similarly, there exists a ramp 43' for discharging full hubs associated with hooks which take the hub from the gripping means 42" of arm 41" to bring it onto said discharge ramp.

The operation of the machine of the invention will be described more particularly with reference to FIG. 10.

The gripping means 42 bring an empty hub into position between shafts 11 and 12 which are open, shafts 11 and 12 close gripping the hub between their ends.

Gripping means 42' still grip the hub but weakly enough so that, when shaft 11 rotates, the hub is rotated.

The control circuit 50 comprises a system of coding wheels 51 which allow the number 4n of holes included in the hub to be displayed. For example 16 is coded for number 4n. 20, 24, 28, 32, 36, 40, 44, etc. may also be coded depending on the number of holes in the hub.

The ouput of coding wheels 51 is connected to a first transcoder 52 which supplies the number n and a second transcoder 53 which supplies the number (1200/n) (in the example chosen the motor makes 1200 steps per revolution).

In the case where 4n is equal to 16, the transcoder 52 supplies 4 at its output and transcoder 53 supplies 300. The number 300 is entered into the up-down counter 54. Transcoder 52 is connected to an up-down counter 65 which counts down from n to O. As soon as this up-down counter 65 is loaded and when it has not yet counted down to 0, it supplies at its output 65" a non-zero signal. Circuit 50 also comprises an enabling device 55 which has two outputs, one output 56 which, when it supplies a signal, causes motor 13 to rotate in the forward direction and an output 57 which, when it supplies a signal, causes the motor 13 to rotate in the reverse direction. When the motor rotates in the forward direction, the hub rotates in the direction shown by the arrow Av (FIG. 4).

The outputs 56 and 57 are applied to a translator 58 which supplies the power to motor 13 and causes it to rotate either in a forward direction, or in the reverse direction.

There is incorporated in translator 58 an oscillator which supplies at its output 59 a sequence of pulses at a given frequency, every time that motor 13 is controlled either forwardly or reversely. It supplies 300 pulses when the motor rotates through ($\pi/n$).

The enabling device 55 comprises inputs 60', 61', 62', 63', 64', 65'. Input 60' is connected to the stop 60 mounted on carriage 17 which indicates that block 18 is in a high position. Input 61' is connected to stop 61 mounted on the carriage 17 which indicates that block 18 is in a low position.

The input 62' is connected to detector 62 which indicates that a spoke is engaged in the ramp 36.

The input 63' is connected to a detector 63 which indicates that a spoke is engaged in ramp 36'.

Output 65' is connected to the output 65" of counter 65 and is activated as long as the counter 65 has not reached zero.

The enabling device only supplies a control signal when 62' and 63' are activated (which indicates the presence of a spoke in ramps 36 and 36'), when 65' is activated and when either 60', or 61' are activated (indicating that the block 18 is either in its high position or its low position).

When block 18 is between its high position and its low position, motor 13 is not supplied with power.

Input 64' is connected through a timer 66 to detector 64 mounted on stop 112 against which carriage 17 comes into abutment when a spoke remains engaged in one of the tubes.

When detector 64 is activated, timer 66 supplies a pulse of given width applied to the input 64' of the enabling device 55 and to an input 65" of the up-down counter 54.

As long as this pulse lasts, the enabling device 55 produces a control signal at its output 57 (motor 13 rotates in the reverse direction) and the up-down counter 54 counts the pulses.

When no signal is applied to inputs 64' and 64" (which is the general case), the enabling device 55 provides a signal at its output 56 (the motor 13 rotates in a forward direction) and the up-down counter 54 counts down.

Thus, when a spoke remains engaged in the tube, this latter is driven under the action of the hub which continues to rotate. Since the tube is interlocked with the carriage 17, this latter is rotated and abuts against stop 112 having the detector 64. The contact with the stop having detector 64 results in motor 13 changing its direction of rotation and so rotates in the reverse direction and the carriage moves away from the stop. The hub then passes again under the tube and the spoke falls completely into the hub. At the end of the pulse generated by the timer 66, motor 13 resumes its original direction of rotation (forwards), but since counter 65 has counted while the motor was rotating in the reverse direction and since it counts down when the motor rotates in the forward direction, the reference has not been lost and the points at which the tubes rise under the action of the jack are evenly spaced apart by ($2\pi/n$).

The control circuit 50 allows the rotation of motor 13 to be controlled so that it rotates through an angle equal to $1.2 \times (\pi/n)$ when block 18 is in its low position and through an angle equal to $0.8(\pi/n)$ when the block is in its high position.

Thus, block 18 prevented from moving up again before the spokes have come down into the hub. It might in fact happen that the downward movement of block 18 brings the nose-pieces, just after the holes, onto the hub, in this case it is advantageous to cause the block to rise again only well after the nose-pieces have passed over the succeeding holes.

The output 0 of the up-down counter 54 is applied to a flip-flop 67 and the outputs 0 and 40 are applied to a flip-flop 68. The outputs of the flip-flops 67 and 68 are connected to an OR gate 69 connected to the input of a flip-flop 70.

An output 71 of flip-flop 70 serves for controlling the rising movement of jack 27 of block 18 and the other output 72 of flip-flop 70 serves for controlling the downward movement of jack 27.

The pulses from output 59 of the translator are applied to an up-down counter 54 which counts them down when the input 64" is not activated and counts them up when input 64" is activated.

The output 72 supplies the up-down counter 75. Every time that block 17 moves upwardly, the up-down counter 65 counts down 1. At the end of four upward movements the up-down counter 65 displays 0 and the signal at 65' disappears preventing any appearance of a control signal at the outputs 56 and 57 of the enabling device 55.

The control system 50 comprises a general control 73 one output 74 of which supplies a pulse controlling a first reset device 75 which loads the counter 65 with the number output by transcoder 52 (in the example, the FIG. 4) and a second reset device 76 which loads the counter 54 with the number output by transcoder 53 (in the example, the number 300).

The reset device 76 is also controlled by an output of counter 65 every time that it changes state, except when it reaches zero.

When counter 65 reaches zero, it feeds a pulse to the general control 73 to indicate that the hub has received all the spokes which it should receive during this pass.

The reset device 76 is further controlled by a circuit 77 taking the leading edge of the pulse from flip-flop 67. Thus, the counter 54 is loaded at 300 under the action of the initial pulse from the output 74. Then, when the motor has rotated by $(\pi/n)$, circuit 77 supplies a pulse to the reset device 76 causing loading of counter 54.

Then, when the up-down counter 65 counts down to 3, the reset device 76 receives a signal and so on.

In addition, the signal from stop 61 is applied to a device 78 controlling opening of latches 38 and 38' which close immediately after dropping a spoke into the tubes. Detector 62 is connected to a device 79 which controls with a slight delay latch 37 every time that the spoke disappears from ramp 36.

Similarly, detector 63 is connected to a device 80 which controls with a slight delay latch 37' every time that the spoke disappears from ramp 36'.

When the cycle is finished, the general control 73 receives a zero pulse from counter 65 and at the next output of the general control a pulse is generated for controlling the following step, the end of each step controlling the beginning of the following step.

Shafts 11 and 12 move apart, then the gripping means 42' turn the hub over and shafts 11 and 12 close again.

A new step for filling the hub is then initiated, the holes remaining free being provided with spokes. When this step is finished, shafts 11 and 12 move apart then arm 41 rotates bringing the filled hub to the discharge ramp while arm 41' places between shafts 11 and 12 a new hub to be filled.

Figure 10:
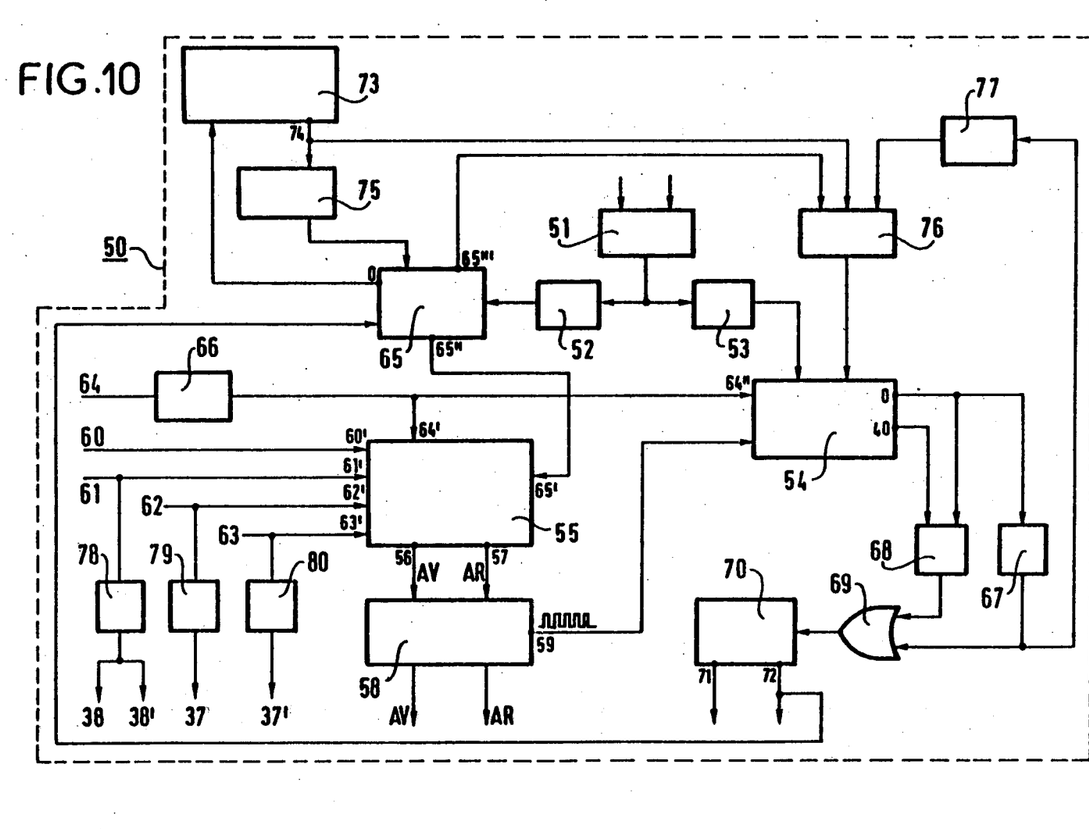
FIG. 10 shows the system for controlling the loading of the spokes.
Figure 11:
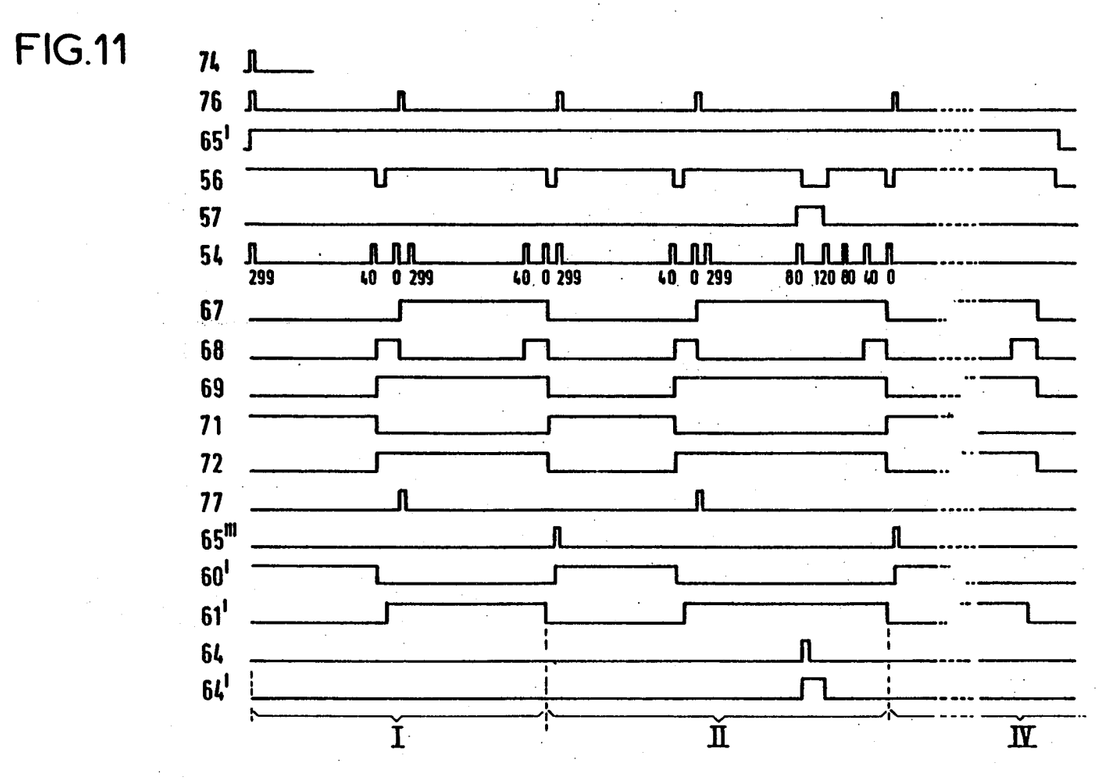
FIG. 11 shows a pulse diagram of the system of FIG. 10.

In FIG. 11 there is shown the diagram of the principal operating signals of FIG. 10.

During the first period I, no hitch occurs. During the second period II, an imaginary hitch (jammed spoke) occurs at the moment when counter 54 is at pulse 80. It counts up as far as 120 then begins to count down again.

Only the end of the fourth period IV is then shown. Once this period is finished, the motor is stopped and the hub must be turned over.

It should be noted that the motor does not rotate when block 18 has left the low stop 61 and has not yet reached the high stop 60 or conversely.

Figure 12:
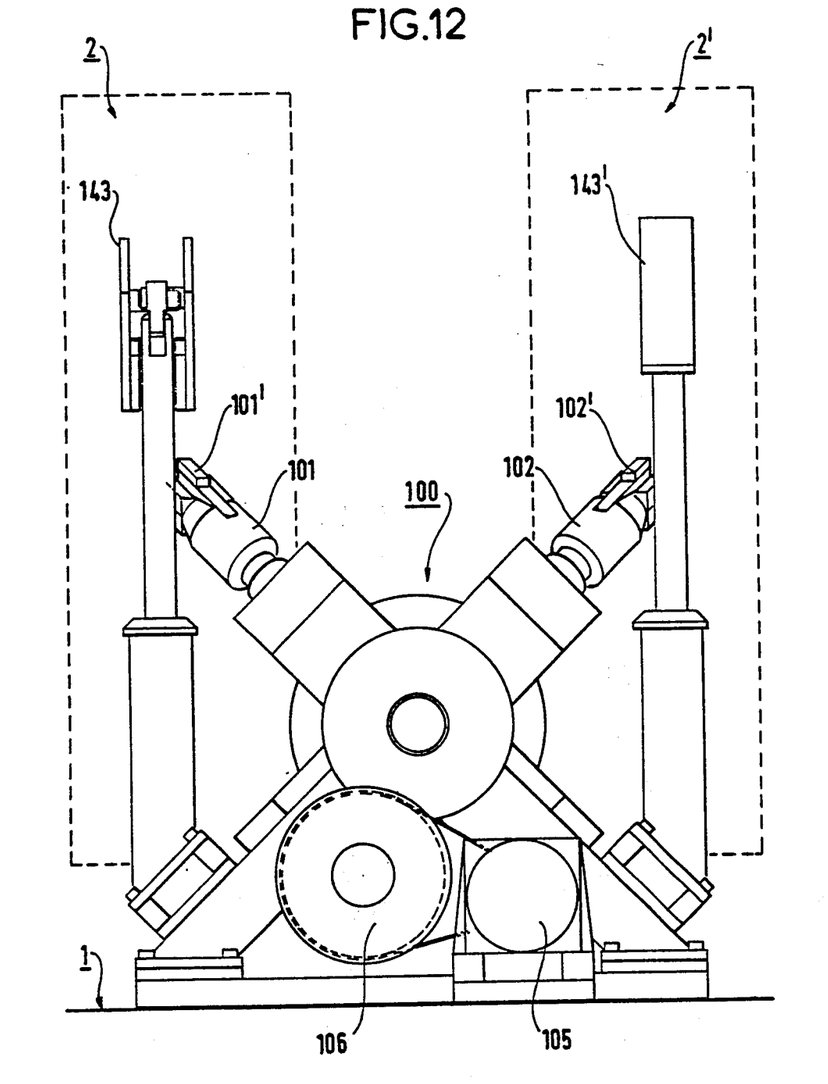
FIG. 12 shows very schematically a front view of a machine with 2 loading posts.

According to another embodiment of the invention shown in FIG. 12, the machine comprises two identical juxtaposed posts 2 and 2'. These two posts have only been shown schematically, they are identical to those shown in FIGS. 1 to 10, except for the handling means 100 which this time comprise four arms 101, 102, 103, 104 instead of three. The handling means comprise a ramp 143 for feeding empty hubs and a ramp 143' for removing full hubs.

These arms are provided at their ends with gripping means 101', 102', 103', 104'.

The gripping means rotate through 180° about the axis of the arms, when the arms rotate through 90° about the horizontal axis of rotation of means 100. A motor 105 through a reducer 106 causes arms 101, 102, 103, 104 to rotate.

The operation of this machine is as follows:

gripping means 101' place a hub between the shaft of post 2, the hub is filled with one spoke out of two, the gripping means 101' place the hub between the shafts of post 2' after turning it over, while gripping means 104' place an empty hub between the shafts of post 2.

As in the simplest embodiment with one post, the tubes of each post are positioned so that for each post the two nose-pieces serve simultaneously a hole on the upper ring and a hole on the lower ring. So that the reference is not lost at the level of the post change, it is necessary for the upper nose-pieces of the two posts to have the same respective position with respect to the hub or to be offset by $(2k\pi/n)$ with k being a whole number $\geq 0$. Of course the nose-pieces will be disposed so that the carriages are driven towards the adjustable stops when a spoke becomes jammed.

When the two posts have each finished filling the spokes, the shafts move away from each other and the gripping means 101' remove the hub filled with spokes from post 2', gripping means 104' bring a hub half-filled with spokes to post 2', gripping means 103' bring an empty hub to post 2 whereas gripping means 102' take an empty hub which will be brought to post 2 during the next pass.

Of course the detector 64 could be disposed on stop 17' in which case, as soon as carriage 17 left this stop 17', under the action of the spoke which would be twisted between the hub and a tube, the motor would rotate in the opposite direction to the selected direction for a given time then would again rotate in the selected direction.

What is claimed is:

1. In a machine for fitting spokes into wheel hubs, each wheel hub having 2n evenly spaced holes, the combination comprising, a frame, a post carried by said frame, first means supported by said post for maintaining said hub in a position in which its axis forms an acute angle of less than 30° with the vertical, second means cooperatively engaged with said first means for rotating said hub about its axis, first and second tubes adjustably carried by said post and forming a small angle with the axis of said hub, a nose-piece carried at an end of each tube, each said nose-piece being associated with a ring of said hub, third means coupled to said tubes for reciprocating said nose-pieces in the vertical direction, said nose-pieces being positioned in a low position just above the associated rings for supplying the holes, fourth means supported by said frame and positioned to supply a spoke to each tube when said nose-pieces are in their low position, so that said spokes descend under the effect of gravity into said tubes with their flattened part in an upward position, control means connected to said first, second, third and fourth means so that said hub is rotated in a selected direction and makes a revolution during which said nose-pieces are moved downwardly n times, and so that, after each downward movement of said nose-pieces, a spoke is fed into each tube, said nose-pieces being lowered every $(2\pi/n)$ and only being raised again after having passed, each one, over at least one hole and after a spoke has fallen under the effect of gravity into the first hole met by each of said nose-pieces, and means carried by said frame for handling said hub so as to take said hub after the first pass and place it, after turning it over, in a position where the remianing holes will be provided with spokes during a second pass.

2. The machine for fitting spokes according to claim 1, wherein said handling means is positioned to place said hub, after turning it over, in the same position which it had during the first pass, and said tubes being adjusted so that said nose-pieces each overhang a hole simultaneously.

3. The machine for fitting spokes according to claim 1, wherein two identical posts are provided, said tubes being adjusted so that the two nose-pieces carried by the tubes of each post each overhang a hole simultaneously, the upper nose-pieces of the two posts being offset by $2k\pi$ with $k \geq 0$, and further comprising means carried by said handling means to take the hub from the first post where it has been provided with spokes, in one hole out of two, during the first pass and place it, after turning it over, between said first means of the second post in which, during the next pass, the remaining empty holes are provided with spokes.

4. The machine for fitting spokes according to claim 3, wherein said handling means comprises four gripping means which move between four positions for simultaneously bringing empty hubs into the work position in the first post, taking hubs half of whose holes are provided with spokes from the work position of the first post to the work position of the second post and discharging the full hubs from the work position of the second post.

5. The machine for fitting spokes according to any one of claims 1, 2, 3, or 4, wherein each post is provided with detection means supplying an error signal indicating that the spoke has not completely entered into the corresponding hole and the control means, in response to the signal from the detection means control the second means of the post, in a first stage, to cause the hub to rotate through an angle equal to or less than $(\pi/n)$ in the reverse direction to the direction chosen then in a second stage causing rotation through the same angle in the chosen direction.

6. The machine for fitting spokes as claimed in claim 5, wherein said detection means comprise a carriage laterally movable from a stop towards which it is returned, said tubes being mounted on said carriage being driven to another stop by the rotational movement of the ring communicated to said tube by the spoke situated partly in said tube and incompletely inserted into the hole of the ring, the two tubes being disposed so that said carriage tends to approach said stop when a spoke is jammed in one or the other tube and one of the stops being provided with a detector supplying the error signal.

* * * * *